Nov. 3, 1936.  C. W. LA PIERRE  2,059,879
RECORDING DEVICE
Filed Dec. 1, 1934
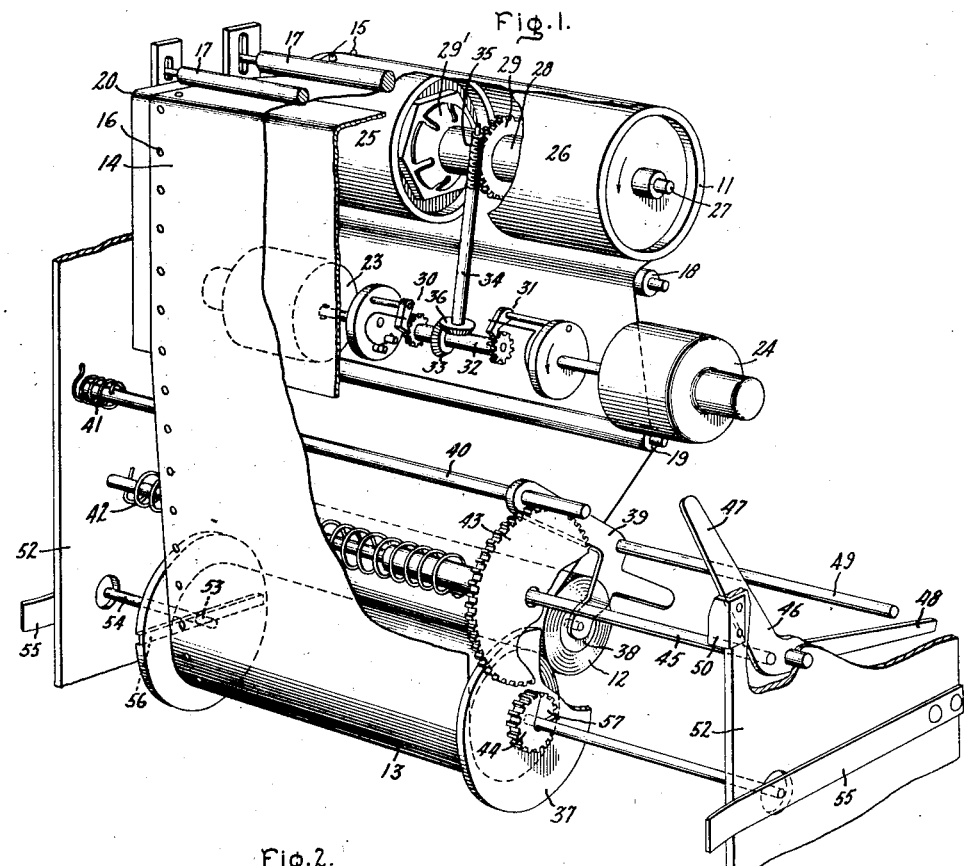
Fig.1.
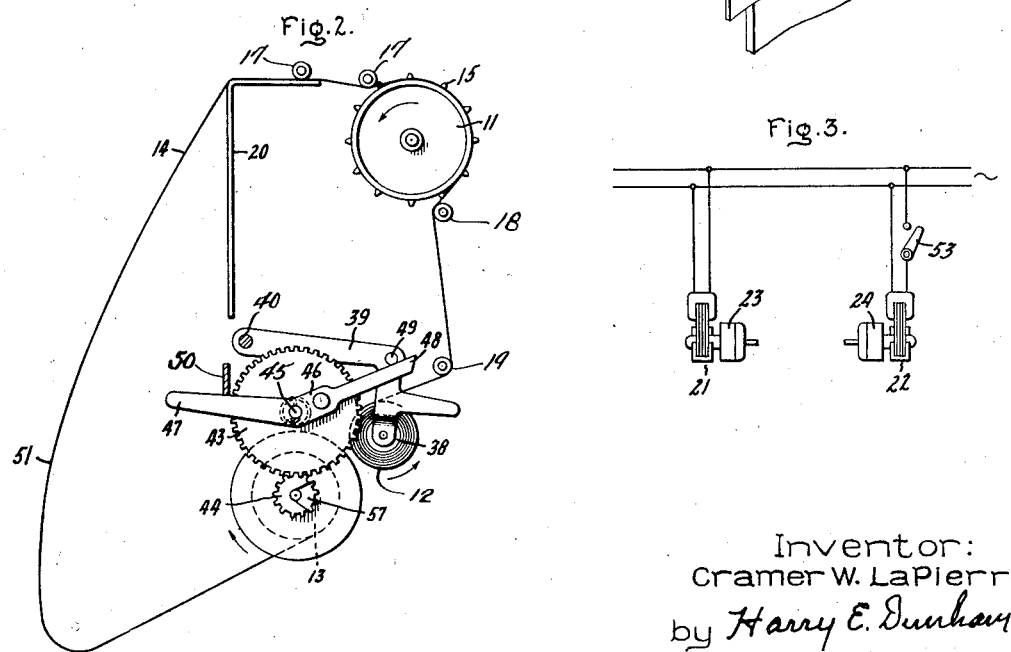
Fig.2.
Fig.3.
Inventor:
Cramer W. LaPierre,
by Harry E. Dunham
His Attorney.

Patented Nov. 3, 1936

2,059,879

UNITED STATES PATENT OFFICE 2,059,879

RECORDING DEVICE

Cramer W. La Pierre, Schenectady, N. Y., assignor to General Electric Company, a corporation of New York Application December 1, 1934, Serial No. 755,643

3 Claims. (Cl. 242—55)

My invention relates to strip chart recorders and concerns particularly improvements in the mechanism for advancing the strip chart in such recorders and for advancing material in strip form in other similar devices.

In constructing strip chart recorders, it has been customary to provide a driving drum, usually with sprockets for engaging perforations in a strip chart for the purpose of accurately timing the motion of the chart, a supply roll and a bobbin for rerolling the chart. In addition to a motor for rotating the driving drum, it has been necessary to provide means for controlling the unwinding of the supply roll and the rewinding of the reroll. In some types of apparatus, this has been done by providing a friction brake for the supply roll and connecting the reroll to the driving motor by a friction belt.

In other types of apparatus, a separate spring motor has been provided for rewinding chart on the reroll and this spring serves also for assisting the driving motor in drawing the record chart from the supply roll. Owing to the continuously changing relative diameters of the supply roll and the reroll, it has been difficult to obtain smooth operation, and undesirable frictional losses have also been in evidence as a result of the friction brake and the friction belt. Further difficulties have been introduced when the strip chart employed was of different than standard length or when a portion of the strip chart was torn out of the apparatus for examination since, in this case, the balance has been upset between the relative diameters of the reroll and the supply roll and the torques produced by the control devices.

My invention has for its object to overcome these difficulties.

More specific objects of my invention are to reduce the energy requirements of a strip chart advancing mechanism by minimizing frictional losses and to provide an arrangement causing the strip chart to traverse the writing table smoothly and uniformly.

Another object of my invention is to provide a driving mechanism construction having a minimum of parts overhanging the chart-carrying drums so that a chart of maximum width may be mounted within an instrument of a given overall width.

Still another object is to provide a simple and reliable arrangement for changing the speed of the record chart.

It is also an object of my invention to provide an arrangement which permits temporarily unrolling a portion of the chart from the reroll drum for examination without interfering with the resumption of the normal operation of the recorder.

It is also an object of my invention to provide an improved construction for a reroll spool which is not readily damaged when being handled and which may easily be reinserted in the apparatus.

Other and further objects and advantages of my invention will become apparent as the description proceeds.

In carrying out my invention in its preferred form, I mount the supply roll of a strip chart recorder on a transversely movable shaft and provide resilient means for pressing the supply roll against the reroll so that the friction between the adjacent surfaces of these rolls causes the reroll to be rotated as the supply roll is rotated by the withdrawal of strip chart therefrom. I may also provide means for temporarily separating the rolls and connecting a winding spring to the reroll when it is desired to unwind a portion of the chart for examination.

The features of my invention which are believed to be novel and patentable will be pointed out in the claims appended hereto. A better understanding of my invention may be obtained by referring to the following description taken in connection with the accompanying drawing in which Fig. 1 represents one embodiment of my invention in perspective with certain portions thereof cut away and other portions separated to permit illustrating more clearly the working parts; Fig. 2 represents schematically a side elevation of the apparatus of Fig. 1; and Fig. 3 is a circuit diagram showing the electrical connections of the driving motors illustrated in Fig. 1.

Referring now more in detail to the drawings in which like reference characters are utilized to designate like parts throughout, the apparatus consists of a driving drum 11, a supply roll 12, and a reroll 13 carrying a record chart 14 in strip form. It will be understood that a suitable movable pen or marking device is employed in connection with the chart carriage illustrated in order to form a recording instrument but the movable marking mechanism does not form a part of the present invention and need, therefore, not be illustrated. Preferably, the driving drum 11 carries sprockets 15 at one or both ends of the drum 11 cooperating with evenly spaced perforations 16 in the moving strip 14 in order that the position and the rate of motion of the strip 14 may be accurately determined by the rotation of the driving drum 11. If desired, guiding rolls, such as the rolls, 17, 18, and 19, may be provided for causing the record strip 14 to travel more evenly in the desired directions.

A bent sheet metal member 20 is provided to serve as a writing table. The horizontal surface acts as a writing table for the recording pen and the vertical surface as the writing table for notations which may be made by the operator attending the recording instrument.

In order to cause the strip chart 14 to travel accurately at a uniform speed, the driving drum 11 is driven by a constant-speed motor, such as a well regulated spring motor, or preferably a synchronous electric motor, such as the synchronous motors 21 and 22 (Fig. 3), operating through suitable gear reductions enclosed in casings 23 and 24 illustrated in Fig. 1. Additional gearing is provided between the motors and the driving drum 11. In order to permit the use of the widest possible strip chart, the driving drum 11 is split in the middle and the gearing is connected there, thus avoiding any loss of chart width by the space occupied by the gearing.

In the arrangement shown, the driving drum 11 consists of two cylindrical portions 25 and 26, both rigidly fastened to a common shaft 27. A sleeve 28, carrying gear wheel 29 is rotatably mounted on the middle portion of the shaft 27 and suitable means, such as spring bushings 29', are provided for causing the sleeve 28 to engage frictionally either the portions 25 and 26 of the driving drum or the shaft 27. In this manner, the driving drum 11 normally follows the rotation of the gear 29 but it is possible to adjust the angular position of the driving drum 11 by hand when desired without causing the driving motors to rotate. Each of the rotor mechanisms within casings 23 and 24 of the driving motors are connected by overruning ratchet mechanisms or clutches 30 and 31, respectively, to a spindle 32 which carries a bevel gear 33. A connecting shaft 34 is provided carrying a worm 35 at one end engaging the gear 29 and a bevel gear 36 at the other end engaging the bevel gear 33.

The reroll 13 consists of a portion of the record chart 14 on which a record has been produced and which has been rewound on a reroll bobbin 37. The supply roll 12 is carried on a bobbin 38 mounted on arms 39 carried by a rotatable shaft 40. The supply roll 12 is, therefore, free to move in a direction transverse to its axis toward or away from the reroll 13. The force of gravity tends to hold the supply roll 12 against the reroll 13. If desired, however, the action of gravity may be assisted by a helical spring 41 arranged to press the arms 39 downward.

In order that a portion of the chart may be unwound from the reroll for examination and will rewind on the reroll automatically after the examination is completed, a temporary reroll winding spring 42 and gears 43 and 44 may be provided. The gear 44 is coaxial with and attached to the reroll bobbin 37 and the gear 43 is carried by a movable shaft 45 which, in turn, is carried at one end by an angle lever 46 having a handle 47 and a supply roll lifting extension 48. One of the supply roll supporting arms 39 carries an extending pin 49 which is adapted to be engaged by the extension 48 of the lever 46. The arrangement is such that, when the handle 47 is pulled downward, the supply roll 12 is lifted away from the reroll 13 by the engagement of the extension 48 with the pin 49 and the gear 43 is lowered into engagement with the gear 44.

A catch 50 may be provided to hold down the handle 47 and prevent the reroll spring gear 43 from slipping out of mesh while the loop 51 of the chart 14 is pulled out for examination, unrolling the reroll 13. This unrolling of the reroll 13 winds the reroll spring 42 through gears 43 and 44, and the spring 42 causes the chart to rewind on the reroll 13 when the loop 51 is released. For the sake of representing the internal mechanism more clearly, the apparatus is shown with the side walls 52 drawn apart and the shaft 45 and pin 49 lengthened to correspond. However, it is self-evident that, in the actual apparatus, the construction is as compact as practicable.

It will be understood that variable chart speeds may be obtained from a single-speed driving motor by employing speed change gearing or by employing replaceable gears of different ratios. In order to provide two principal speeds which may be used alternatively with the simplest type of control for changing the speed, I provide two separate constant-speed motors 21 and 22 and each of these is connected to the driving drum through the overrunning gears 30 and 31. If either motor is running and the other is at a standstill, the motor which is running controls the speed and operation of the driving drum and the spindle 32 simply overruns the other motor. In changing from a lower speed to a faster speed, it is unnecessary to shut down the slower speed motor since the faster motor will then control the driving drum and overrun the slower motor. For this reason, I need provide only one speed control switch 53 controlling the higher speed motor 22, causing the chart to move at high speed when the switch is closed and permitting the chart to run at low speed when the switch is open.

Reroll bobbins for recording instruments are commonly provided with short coaxial pins projecting from the ends of the bobbins to cooperate with slots or resiliently mounted bearings in the chart frame in order that the bobbins may readily be inserted and removed. Such projecting pins, however, are frequently damaged by dropping or handling of the bobbins when they are removed from the chart carriage. I prefer, therefore, to provide suitable openings in the reroll bobbin and to mount cooperating pins on the supporting framework. For example, the reroll bobbin 37 may be provided with coaxial openings 53 adapted to receive pins 54 resiliently mounted on the side walls 52 by means of spring strips 55. To facilitate the mounting of the reroll bobbin 37, it is provided with a straight slot 56 across one end of the bobbin and a V-shaped slot 57 in the gear 44 at the other end. The slots 56 and 57 are arranged to guide the pins 54 into the openings 53 as the bobbin 37 is being inserted in the chart carriage.

During the operation of the apparatus, the driving drum 11 is driven by one or the other of the motors 23 or 24 and the chart is continuously withdrawn from the supply roll 12. The friction between the contacting rolls 12 and 13 causes the reroll 13 to be wound up as the supply roll 12 is unwound, as the rolls rotate in opposite directions. Owing to the fact that the peripheral velocities of the rolls 12 and 13 are necessarily the same regardless of the diameter of either, the record sheet is wound up at the same rate as it is unwound. Consequently, it is always held smooth without excess tension and there are no frictional losses from supplementary devices which would otherwise be required to keep the sheet 14 smooth.

In accordance with the provisions of the patent statutes, I have described the principle of operation of my invention together with the apparatus which I now believe to represent the best embodiment thereof but I desire to have it understood that the apparatus shown is only illustrative and that the invention may be carried out by other means.

What I claim as new and desire to secure by Letters Patent of the United States, is:

1. In a strip chart recorder, the combination of a record chart in strip form, means for advancing said strip in the recorder, a supply roll and a reroll normally in frictional engagement with said supply roll, means for separating said supply roll and said reroll to permit a portion of the chart to be unrolled from the reroll, a spring for connection to said reroll arranged to be wound as the reroll is unrolled, and means for connecting said spring to said reroll only when said reroll and said supply roll are separated.

2. A wide chart recorder of the moving strip type having a driving drum for advancing the chart, a chart supply roll, and a chart reroll normally in frictional engagement with said supply roll to cause the reroll to be rotated and to roll up the chart as the driving drum withdraws the chart from the supply roll and rotates the latter, said driving drum comprising two coaxial cylindrical portions with an axial spacing therebetween, a shaft connecting said cylindrical portions, a driving motor and gearing connecting said motor to said shaft whereby the motor and the driving gearing come within the outline of the outer ends of the chart-driving drum.

3. A removable spool for carrying material in strip form in apparatus having a stationary spool mounting including inwardly extending mounting pins, said spool having coaxial pin-receiving openings in the ends to cooperate with mounting pins and having a V-shaped transverse slot in an end of said spool with its apex at one of said openings for the purpose of guiding a corresponding mounting pin into said opening when said spool is inserted into a mounting.

CRAMER W. LA PIERRE.